United States Patent [19]

Wernecke

[11] Patent Number: 4,580,965

[45] Date of Patent: Apr. 8, 1986

[54] INJECTION MOLD SAFETY CONTROLS

[76] Inventor: Robert A. Wernecke, 1407 Cole, Birmingham, Mich. 48008

[21] Appl. No.: 608,052

[22] Filed: May 8, 1984

Related U.S. Application Data

[63] Continuation-in-part of Ser. No. 450,882, Dec. 20, 1982, abandoned.

[51] Int. Cl.$^4$ .................. B29C 39/22; B29C 39/44
[52] U.S. Cl. .................. 425/145; 164/153; 192/129 B; 425/151; 425/166; 425/167; 425/171
[58] Field of Search .................. 425/151–153, 425/145, 166, 167, 171; 164/152, 153; 116/70; 192/129 B

[56] References Cited

U.S. PATENT DOCUMENTS

| | | | |
|---|---|---|---|
| 3,632,251 | 1/1972 | Henry | 425/166 |
| 3,677,680 | 7/1972 | Etherington | 425/152 |
| 3,991,639 | 11/1976 | Pfeifer | 192/129 B |
| 3,998,574 | 12/1976 | Blake | 425/152 |
| 4,040,776 | 8/1977 | Kelz | 425/145 |
| 4,106,607 | 8/1978 | Badavas | 192/129 B |
| 4,131,189 | 12/1978 | Stephens | 192/129 B |
| 4,131,596 | 12/1978 | Allen | 425/150 |
| 4,261,450 | 4/1981 | Matsushima et al. | 192/129 B |

FOREIGN PATENT DOCUMENTS 2341381  2/1975  Fed. Rep. of Germany .
49-41106 11/1974 Japan .

Primary Examiner—Willard E. Hoag

[57] ABSTRACT

A contact sensing system senses the contact of two parts, such as the closure of two die parts in a molding machine, and controls a subsequent event such as the introduction of fluent molding material into the mold when closure of the die parts is sensed. One of the die parts is provided with an orifice which is covered by the other die part when the mold is closed. Sensing is achieved by delivering air through the orifice using an air line and sensing the pressure increase in the line when the orifice is closed by the other die part. A control module houses the components of the sensing system and protects the components in hostile environments.

19 Claims, 7 Drawing Figures

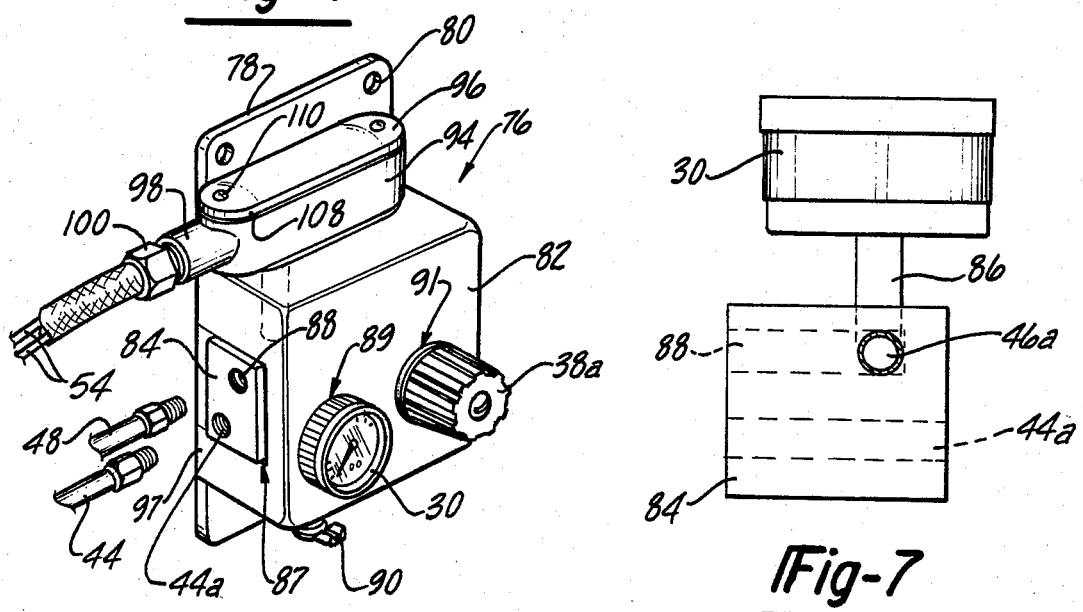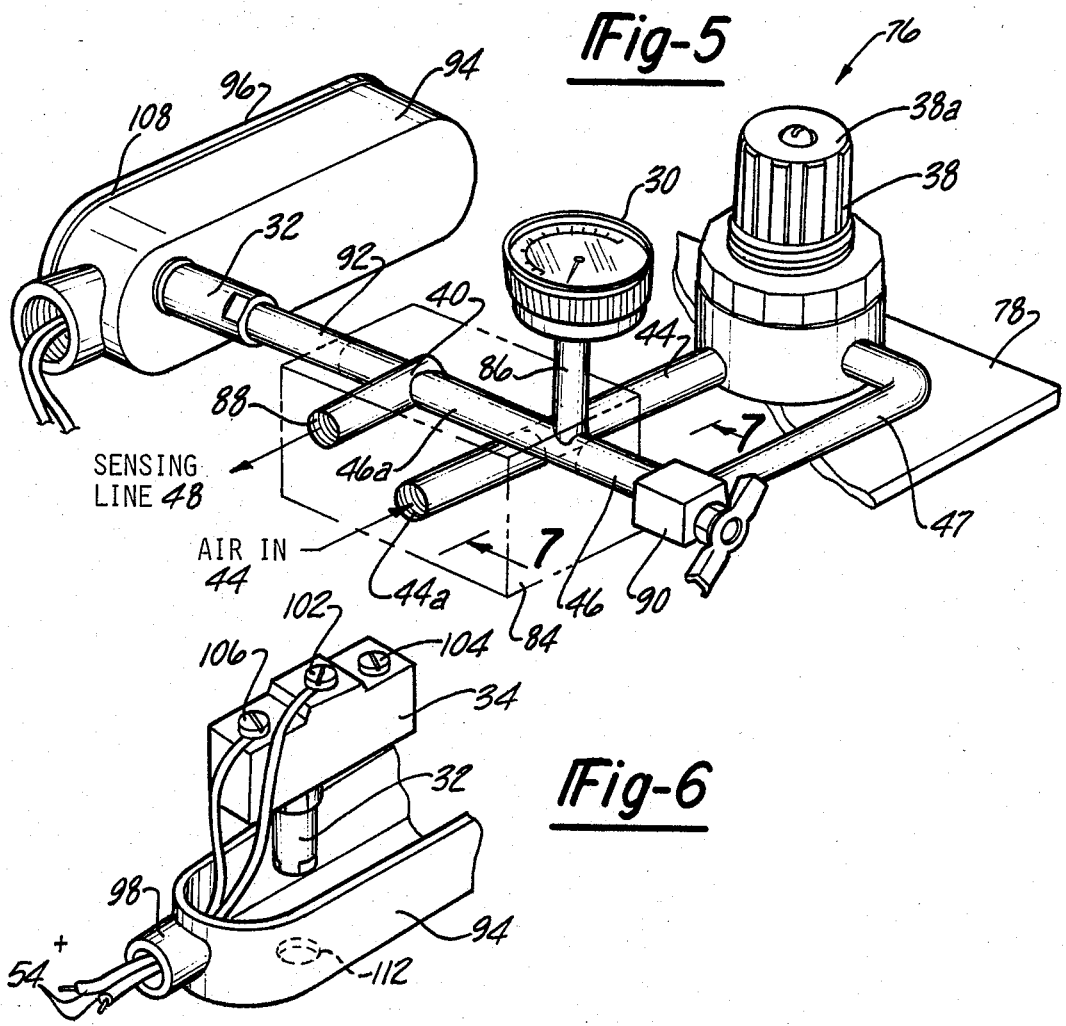

INJECTION MOLD SAFETY CONTROLS

RELATED APPLICATIONS

This application is a continuation-in-part of U.S. patent application Ser. No. 450,882 filed Dec. 20, 1982 and now abandoned.

TECHNICAL FIELD

The present invention broadly relates to systems for sensing the contact of two relatively movable parts, and deals more particularly with control of a molding operation requiring the closure of two die parts.

BACKGROUND ART

Various types of molding operations employ a mold comprising two or more die parts which are movably mounted relative to each other to permit release of a molded part after the molding operation has been completed. Obviously, it is necessary to assure that the die parts are closed prior to introducing fluent molding material into the mold in order to avoid waste, etc.

The problem of assuring that the die parts are closed prior to introducing fluent molding material into the mold is particularly important in connection with automated systems such as an injection molding machine, especially where the fluent molding material, e.g., metal, plastic, etc. has been heated to a temperature which poses a severe health hazard to operating personnel in the event that the material contacts the operator's skin. In connection with an injection molding machine, the material is injected at relatively high pressure into a multi-piece mold immediately following closure of various die parts which form the mold. In the event that the molding material is injected into the mold shortly before closure of the die parts, the relatively high injection pressure causes the material to shoot out from around openings in the die parts and may be carried yards away from machine. As a result of this serious health hazard, metal guards are often installed on the machine so as to protectively surround the mold and thereby shield the machine's operator from errant molding material in the event that injection takes place before the die parts are fully closed.

In the past, others have resorted to the use of a mechanical limit switch for sensing the point in time at which the die parts of the mold are fully closed. In the case of an injection molding machine, one die part remains stationary while the other die part is reciprocated from an open, release position to a closed molding position by means of a piston and cylinder; a limit switch is mounted on the machine so as to be tripped by the movable die part approximately at the point where the die parts make contact. This approach to the problem has not been satisfactory from the standpoint of reliability. The mechanical limit switch and trip arm employed to actuate the same are subject to wear and misadjustment. More importantly, in connection with molding operations employing heated molds and molding material, the various parts of the mold and machinery expand (due to heating) relative to the trip arms and other parts employed to mount the switch, thereby altering the point at which the switch is actuated. Consequently, it may be appreciated that the use of prior art limit switches provides, at best, a means of sensing the gross position of the die parts relative to each other.

Others in the past have suggested the use of a pneumatic system for sensing the closure of two parts. For example, U.S. Pat. No. 4,106,607 issued Aug. 5, 1978 to Charles Badavas discloses a pneumatic safety system for a safety enclosure surrounding a machine. The enclosure includes a door which, when opened, stops operation of the machine to prevent injury to personnel. The system disclosed in this prior patent is similar to that previously described in the sense that it merely provides for gross position sensing and is not adaptable for use with an injection molding machine wherein it is necessary to precisely correlate injection timing with the complete closing of the die parts.

Thus, there is a clear need in the art for a system which reliably senses the complete closure of two or more die parts, whose accuracy is not adversely affected by the temperature of the mold and which delays enablement of the injection process is a fixed time following closure of the die parts to assure that the injection occurs only after the mold is closed and pressure has built up in a pressurized fluid system which closes the parts.

DISCLOSURE OF THE INVENTION

In accordance with the present invention, a contact sensing system senses the contact of two parts such as the closure of die parts in a molding machine and automatically controls a subsequent event such as the introduction of fluent molding material into the mold when closure of the die parts is sensed. One of the die parts is provided with an orifice therein which is open when the die parts are spaced apart from each other and the mold is open, but which is closed by a face of another die part when the mold is closed. A pressurized source of compressible fluid such as air is connected by a first line to a pressure transducer which senses the line pressure and actuates a limit switch when the sensed pressure exceeds a preselected value. Actuation of the limit switch enables an injector which introduces fluent molding material into the mold. A second fluid line is coupled between the orifice and the first line, thereby bleeding fluid from the first line when the orifice is open.

With the mold open and the die parts spaced apart, the sensed line pressure is relatively low and the limit switch is deactivated, thus disabling the injector. However, upon closure of the mold, the orifice is sealed and the line pressure increases. Since a compressible fluid, such as air is employed, compression of the fluid results in a slight delay in the build-up of line pressure; this time delay assures that the limit switch is actuated only after a prescribed time interval following closure of the mold. A flow control valve and a pressure regulator cooperate to control line pressure and flow rate which determine the time by which actuation of the limit switch is delayed following closure of the mold.

As a further safety measure to prevent actuation of the injector in the event of a malfunction in the fluid-pressure control system, a second switch is connected in circuit with the limit switch. The second switch is mechanically operated by one of die parts. A process controller activates the injector only in response to closure of both of the switches.

A further feature of the invention comprises a compact control module which contains the pressure regulator, a flow control and shut-off valve, the limit switch and an associated pressure sensor, a pressure gage and all of the lines required to interconnect such components. A fluid manifold in the module allows rapid connection of the module between a source of pressured fluid and the mold.

BRIEF DESCRIPTION OF THE DRAWINGS

In the drawings, which form an integral part of the specification and are to be read in conjunction therewith, and in which like components are designated by identical reference numerals in the various views:

FIG. 4 is a perspective view of a control module employed in the contact sensing system of the present invention;

FIG. 5 is a perspective view of the module shown in FIG. 4, but with the cover removed and parts of the mounting plate broken away in section;

FIG. 6 is a perspective, exploded view of the pressure sensor, limit switch and associated receptacle employed in the module of FIGS. 4 and 5; and FIG. 7 is a sectional view taken along the line 7—7 in FIG. 5.

BEST MODE FOR CARRYING OUT THE INVENTION

Figure 1:
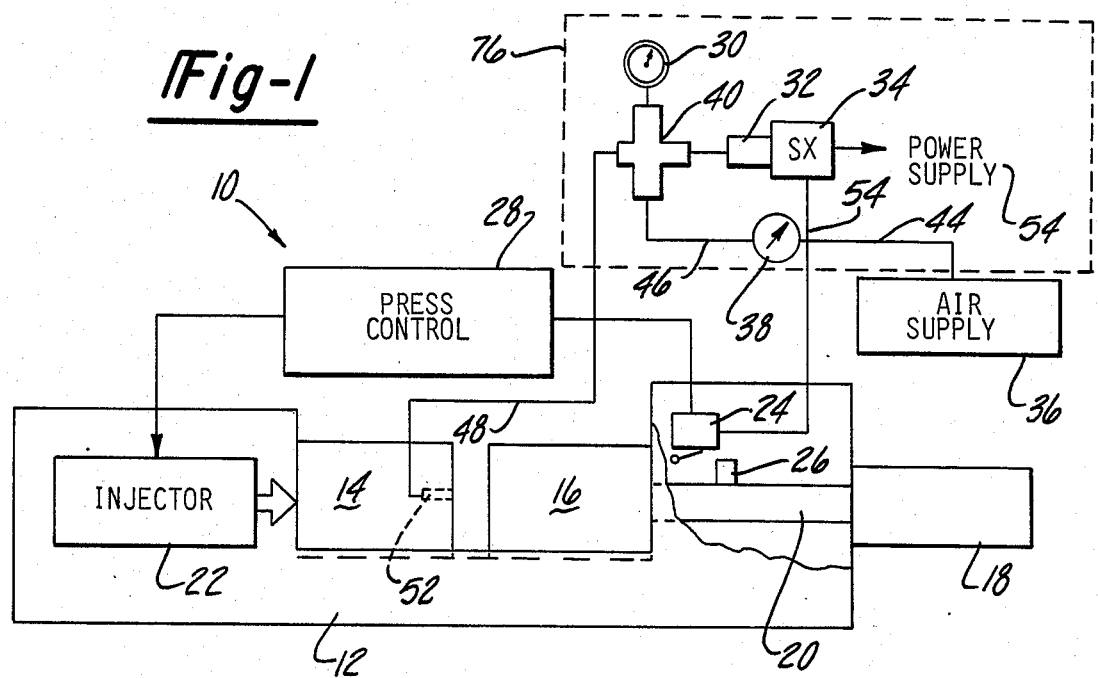
FIG. 1 is a combined diagrammatic and elevational view of an injection molding machine employing the contact sensing system which forms the preferred embodiment of the present invention.
Figure 2:
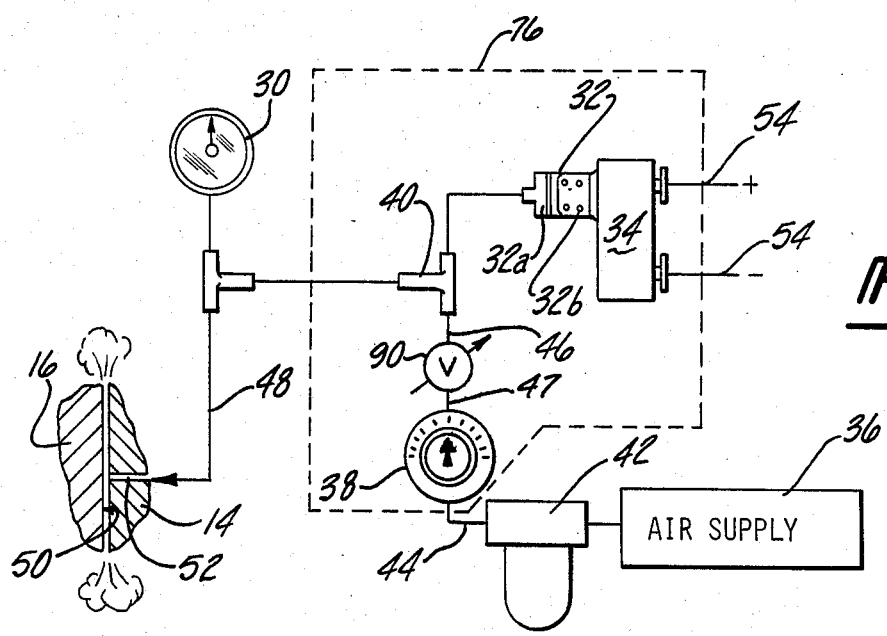
FIG. 2 is a detailed view of the system shown in FIG. 1.

Referring first to FIGS. 1 and 2, the present invention is broadly concerned with a contact sensing system generally indicated by the numeral 10 in FIG. 1 for sensing the contact between two parts, such as die parts 14 and 16 and controlling a subsequent operation such as the injection of fluent material into a mold defined by the die parts 14,16 in an injection molding machine 12.

Die part 14 is stationarily mounted and is provided with an aperture (not shown) for receiving fluent molding material under high pressure from a conventional injector 22. Die part 16 is reciprocably mounted relative to die part 4 and is driven by an output rod 20 of a piston and cylinder combination 18. As viewed in FIG. 1, piston and cylinder 18 shift die part 16 toward the right to an open position in order to remove a part (not shown) which has been molded by machine 12, and is subsequently shifted toward the left, into contact with die part 14, thereby closing the mold in preparation for injection of molding material into the mold by injector 22.

Injector 22 is controlled by a press control 28, which is in turn selectively enabled by system 10. System 10 includes first and second limit switches 24 and 34 respectively which are coupled in series relationship with each other between a suitable supply of voltage 54 and press control 28. Thus, press control 28 is enabled to operate injector 22 only when switches 24 and 34 are both actuated to complete a circuit. Limit switch 24 is tripped by an arm 26 which may be mounted either on the die 16 or, as shown in the drawings, on rod 20. Switch 24 and arm 26 are positioned such that arm 26 actuates switch 24 approximately at the point in the displacement of die part 16 when the latter contacts die part 14 and effects closure of the mold. Limit switch 24 merely senses gross position sensing of the die parts 14,16 and thus acts as a fail safe back-up for the remaining portion of the system which will be described below.

Other types of circuit arrangements for interconnecting the switches 24 and 34 will be apparent to those skilled in the art. For example, switches 24 and 34 may be independently connected with the press control, in which case the press control 28 will include logic for sensing the closure of both of the switches 24 and 34 before activating the injector 22. It may thus be appreciated that switches 24 and 34 respectively comprise first and second control means for producing corresponding control signals, both of which must be present before the injector 22 is activated by the press control 28.

As best seen in FIG. 2, one face of die part 14 is provided with an orifice 52 therein which may, by way of example, be approximately 0.090 inches in diameter. Orifice 52 is positioned such as to be closed off against fluid flow therethrough by an opposing face 50 of die part 16 when the mold is closed. A suitable source 36 of a compressible fluid such as air delivers the fluid through a suitable filter 42 and fluid line 44 to a conventional pressure regulator 38. Fluid having a regulated pressure is delivered via a connecting line 47 to a flow control and shut-off valve 90, thence through supply line 46 to the fluid input of a conventional pressure transducer 32 such as that commercially available from the Clippard Company in Cincinnati, Ohio and identified by the manufacturer's Part No. MTA-7. Transducer 32 includes a pressure operated piston 32a acting against the force of a spring 32b in order to operate limit switch 34 when the pressure in line 46 reaches a preselected value. Fluid is also delivered from valve 90 via a T connection 40 and pressure sensing line 48 to orifice 52. A conventional pressure gage 30 is connected with line 48 for providing a visual indication of the pressure in pressure sensing line 48.

In operation, with the mold open and die parts 14,16 spaced apart, fluid from the supply 36 flows through lines 44, 46 and 47 to the transducer 32. However, since the orifice 52 is open, a major portion of the fluid bleeds through line 48 and orifice 52 into the open atmosphere. With the pressure in line 46 relatively low, limit switch 34 remains unactuated by transducer 32 and the press control 28 is disabled as is the injector 22. At the instant of the closure of die parts 14 and 16, the face 50 of die part 16 seals off the orifice 52 against fluid flow therethrough thus preventing bleeding of fluid through line 48. With orifice 52 closed off, the pressure in line 48 commences to increase. However, since the fluid is compressible, the pressure in line 48 does not immediately increase to the level of the fluid supply 36, but rather increases gradually over a period of time to that of the supply pressure. The transducer 32 senses the fluid pressure in line 48 and actuates the limit switch 34 when the sensed pressure exceeds a preselected value, determined in part by the resistance presented by spring 32b. It may thus be appreciated that even though die parts 14 and 16 are closed, thereby sealing orifice 52, there exists a repeatable time delay following closure of the die parts 14,16 before the circuit is closed to press control 28 to enable operation of the injector 22. This time delay assures not only that the die parts 14,16 have contacted each other but that fluid pressure has built up in cylinder 18 thus assuring that the force by which the die parts are closed is sufficient to prevent escape of fluent molding material from the mold. As previously indicated, limit switch 24 is employed as a fail safe device in the event that the remaining portions of the sensing system malfunction, as where, for example, orifice 52 becomes blocked by dirt or flashing created by the molding material.

The flow control valve 90 controls the volume or rate at which fluid flows through supply line 46, while the regulator 38 controls the pressure of the fluid in line 46. The regulator 38 senses the pressure in the connecting line 47 and controls the flow through its outlet in order to maintain a preselected, desired line pressure. Since the flow control valve 90 is downstream of the reegulator 38, it may be appreciated that valve 90 primarily determines the rate of fluid flow through lines 46 and 48 at a pressure determined by regulator 38. The length of the time delay between actuation of switch 34 and closure of orifice 52 is primarily determined by the fluid flow rate in lines 46 and 48, and to some extent by the regulator 38. Thus, the time delay may be readily adjusted by controlling the flow rate using valve 90 and, to some extent, by changing the pressure setting of the regulator 38. Valve 90 also serves to control the volume of fluid engaging from the orifice 52 when the die parts are open, thus providing a means of conserving the use of the fluid. Further, valve 90 acts as a shut off device to prevent delivery of supply fluid to lines 46 and 48, as when the sensing system is not in use.

The pressure gage 30 provides a means of visually indicating that the sensing system is functioning properly. Gage 30 will read "zero" when the valve 90 is closed. If the pressure indicated by the gage 30 does not decrease when the die parts are opened, a malfunction is made apparent, as would occur for example, if the orifice 52 becomes clogged or partially blocked.

Figure 3:
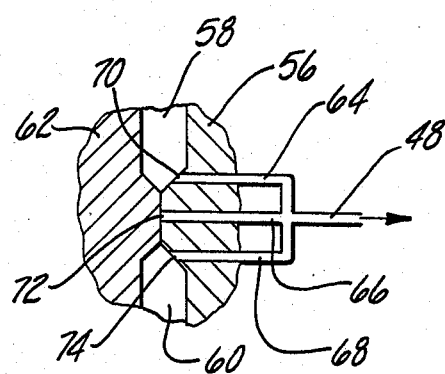
FIG. 3 is a cross-sectional view of a multi-part molding die adapted to be employed with the sensing system shown in FIGS. 1 and 2.

Attention is now directed to FIG. 3 wherein an alternate form of a portion of the sensing system is depicted for use with a complex molding die comprising of die parts 56, 58, 60 and 62. In this type of molding die, it is necessary to assure that all of the parts are in contact with each other (thereby closing the mold) before the injection process takes place. The contact sensing system of the present invention may be adapted for use with this type of molding die by providing a plurality of orifices 70, 72 and 74 at various points in the face of die part 56 so as to be respectively sealed by corresponding faces of the other die parts 58, 60 and 62. Orifices 70-74 are connected in parallel with each other by means of fluid lines 64-68 which are in turn coupled with the fluid delivery line 48. It may therefore be appreciated that limit switch 34 is enabled by the sensing system only when all of the orifices 70-74 are closed by the respectively associated die parts 58, 60, 62.

Reference is now made to FIGS. 4-7 wherein a unique control module is depicted for the contact sensing system of the present invention. The control module, generally indicated at 76 is a lightweight compact unit which may be readily mounted on or adjacent to the molding machine 12 and provides a simple means of connecting the control components of the system previously described with the fluid sensing line 48, the fluid supply line 44 and electrical lines 54.

The module 76 includes a planar mounting plate 78 provided with apertures 80 for receiving screws (not shown) which mount the module on any suitable supporting surface. The remaining components of the module 76 which will now be described are conveniently mounted on the front face of the mounting plate 78. More specifically, mounted to the plate 78 by any suitable means such as screws (not shown) are a sealed receptacle 94 and a fluid manifold block 84. The fluid manifold block 84 includes a first fluid passageway 44a through two sides thereof. The opposite ends of the passageway 44a are threaded to respectively receive a threaded, fluid tight coupling of the air supply line 44 and a fluid tight coupling on one end of a connecting line 44, the opposite end of line 44 being connected to the inlet of a conventional air regulator 38. The regulator 38 includes an outlet connected by another connecting line 47 through a flow control and shut-off valve 90 and supply line 46 to a second passageway 46a in the block 84. Passageways 44a and 46a extend completely through the block 84 and transverse to each other. A fluid pressure gage 30 is connected with the passageway 46a by a connecting line 86 which also physically supports the gage 30 on and above the block 84.

A third fluid passageway 88 extends through one side of the block 84, adjacent the passageway 44a and communicates the passageway 46a. Passageway 88 is threaded to receive a fluid tight coupling connected with the fluid sensing line 48. The end of the fluid passageway 46a opposite the shut-off valve 90 is connected by line 92 to a fluid pressure sensor 32. Sensor 32 is a conventional device which may comprise, by way of example, a spring loaded piston within a cylinder. The piston is displaced against the force of the spring by the requisite degree of fluid pressure in line 92. The piston of sensor 32 has an output shaft connected to a conventional switch 34 which is contained within the receptacle 94. Switch 34 includes a common terminal 102 as well as a normally open terminal 104 and a normally closed terminal 106. One of the electrical lines 54 may be connected either to terminal 104 or 106 depending upon whether the circuit connected with lines 54 is to be normally open or normally closed when the fluid pressure sensed by sensor 32 is below a preselected value. The switch 34 is securely mounted within the receptacle 94 and is sealed from the surrounding environment by virtue of the fact that the sensor 32 extends through but is sealed around an aperture in the bottom of the receptacle, a neck portion 98 through which the leads 54 are trained is sealed by a threaded coupling 100, and a cover 96 removably secured to the top of the receptacle 94 by screws 110 is provided with a gasket 108 between the cover 96 and the receptacle 94.

Connecting lines 44, 46, 47, 86 and 92 are preferably formed of rigid metal tubing, such as copper, aluminum or brass. Assuming these connecting lines are relatively rigid, it is not necessary to physically secure the regulator 38 to the plate 78, rather connecting lines 44, 46 and 47 provide a rigid mechanical connection between the regulator 38 and the block 84 so as to support the regulator 38 in a fixed position on the face of the plate 78.

The module 76 further includes a generally rectangular cover 82 which extends over a substantial portion of the face of the mounting plate 78 and is removably secured on the plate 78 by means of fingers 97 which frictionally engage opposite edges of the plate 78. The cover 82 includes a plurality of openings therein, including a pair of circular openings 89, 91 of the front face thereof through which the face of the pressure gage 30 and regulator control knob 38a respectively extend. Openings (not shown) on the top and bottom walls of the housing 82 are provided for the sensing device 32 and the valve 90. Finally, a generally rectangular opening 87 in one side wall of the cover 82 conforms with the contour of the side of block 84 in which passageways 44a and 88 are defined. As best seen in FIG. 4, the face of the block 84 in which the passageways 44a, 88 is defined is substantially coplanar with one side of the cover 82.

It may thus be appreciated that the cover 82 protectively encloses the fluid connecting lines of the module components from the surrounding environment, while at the same time allowing ready access to the shut-off valve 90 gage 30 and pressure regulator knob 38a. Furthermore, ready access is available to wire the limit switch 34 within the receptacle 94 and fluid lines 44 and 48 may be readily connected to the fluid manifold block 84 without removing the cover 82.

The control module 76 is well suited for use in hostile environments where it may be subjected to dirt, grease, heat and physical abuse. Moreover, the control module 76 contains all of the control components of the contact sensing system of the present invention so that these components may be mounted in the same area, as a single unit.

From the foregoing, it is apparent that the contact sensing system of the present invention not only provides for the reliable accomplishment of the objects of the invention but does so in a particularly effective and economical manner. It is recognized that those skilled in the art may make various modifications or additions to the preferred embodiment chosen to illustrate the invention without departing from the spirit and scope of the present contribution of the art. Accordingly, it is to be understood that the protection sought and to be afforded hereby should be deemed to extend the subject matter claimed and all equivalents thereof fairly within the scope of the invention.

I claim:

1. For use with injection molding apparatus of the type having a mold and means for injecting fluent material in to said mold, said mold including a pair of die portions movable relative to each other between a closed position defining a mold cavity into which said fluent molding material may be injected by said injection means to mold a part and an open position in which the molded part may be removed from said mold, a safety system for preventing injection of said fluent material into said mold prior to closure of said die portions, comprising:
   first and second opposing faces respectively on said pair of die portions;
   at least one aperture in said first face, said aperture being open when said die portions are in said open position thereof, said second face substantially closing said one aperture against air flow therethrough when said die portions are in said closed position thereof;
   a T connector having first, second and third branches with the second and third branches coaxially aligned and intersected by the first branch;
   a first fluid line interconnecting the first branch with said one aperture;
   a second fluid line interconnecting the second branch with an air supply means, said air supply means including a source of pressurized air and an air pressure regulator and a valve for changing the rate of pressure increase of air supply to said one aperture, said valve being connected between said regulator and said second branch whereby the changes in said rate of pressure increase affected by said pressure rate changing means alters the duration of the delay between the time said die portions complete their move to said closed position thereof and the time said enabling means enables operation of said injections means, said time delay resulting from a progressive build-up of air pressure in said air supply lines;
   a third fluid line interconnecting the third branch with a means for sensing the magnitude of air pressure in said third fluid line;
   said T connector operatively coupling said first, second and third fluid lines such that when said die portions are in said open position air pressure is reduced in said lines and sensed by said sensing means and when said die portions are in said closed position air pressure is increased in said lines and sensed by said sensing means;
   means automatically responsive to said sensing means for enabling said injection means to inject said fluent material into said mold when the magnitude of said air pressure sensed by sensing means is at least as great as a preselected value thereof, and for disabling said injection means when said sensed magnitude is less than said preselected value.

2. The safety system of claim 1, wherein said first face includes another aperture therein spaced from said aperture and communicatively coupled with said air supply line.

3. The safety system of claim 1, wherein:
   said sensing means includes a mechanical transducer having a displaceable output and operative for converting air pressure in said supply line to displacement of said output, and
   said enabling means includes an electrical switch controlled by said displaceable output.

4. The safety system of claim 1, wherein said enabling means includes:
   a first electrical switch operated by said sensing means; and
   a second electrical switch connected in circuit with said first switch and said injection means, said second switch being operated by relative movement of said die portions, said first and second switches being arranged such that operation of each thereof is required to enable operation of said injection means.

5. Apparatus for controlling two consecutive operations in a machine in timed relationship to each other, the first operation including the movement of two spaced apart members into contact with each other, the second operation commencing only after said members are in contact with each other, comprising:
   an orfice in one of said members through which a compressible fluid may flow;
   means carried by the other of said members for closing said orifice against fluid flow when said members are in contact with each other;
   a T connector having first, second and third branches with the second and third branches coaxially aligned and intersected by the first branch;
   a first fluid line interconnecting the first branch with said one aperture;
   a second fluid line interconnecting the second branch with a fluid supply means for supplying said compressible fluid under pressure to said orifice, said fluid supply means causing said fluid to flow through said orifice when said members are spaced apart and compressing said fluid when said members contact each other and said orifice is closed;
   a third fluid line interconnecting the third branch with a means for sensing the pressure of said fluid supply to said orifice by said supply means;

first control means responsive to said sensing means for producing the first electrical control signal for initiating said second operation when the fluid pressure sensed by said sensing means exceeds a preselected value thereof, the compressibility of said fluid resulting in a time delay between the closing of said orifice and the build-up of said fluid pressure to said preselected value thereof;

second control means for sensing the movement of at least one of said members and for producing a second control signal when movement of said one member is sensed; and third control means responsive to said first and second control signals for initiating said second operation only upon receipt of both of said first and second control signals; and means for varying the rate at which fluid is supplied by said fluid supply means to said orifice whereby to control the amount of said time delay.

6. The apparatus of claim 5, wherein said fluid supply means includes:

a source of said fluid;

a first fluid line delivering said fluid to said sensing means; and a second fluid delivery line coupled with said first line and said orifice for normally bleeding fluid from said first line to said orifice when the latter is open, said pressure rate varying means being coupled with said first line.

7. The apparatus of claim 5, wherein said first and second control means respectively include first and second electrical switches coupled in circuit with each other and with said third control means.

8. The apparatus of claim 5, including a self-contained control module, said sensing means, said first control means and said pressure varying means being defined within said module.

9. The apparatus of claim 8, wherein:

said control module includes a mounting face and a cover on said face and covering said face, said cover including a plurality of openings therethrough;

said pressure rate varying means including a control member extending through one of said openings in said cover, and said apparatus further includes a plurality of fluid lines between said mounting face and said cover for interconnecting said sensing means, said fluid supply means and said pressure rate varying means.

10. The apparatus of claim 9, wherein said control module includes a fluid manifold block having one side thereof adjacent one of said openings in said cover and accessible through said one opening, said fluid manifold block including a fluid inlet and a fluid outlet said one side thereof.

11. Apparatus for sensing the closure of first and second die parts or the like, comprising:

a sensing line terminating in an orifice in said first part through which a compressible fluid may flow;

a surface on said second part for engaging said first part and for closing said orifice against fluid flow therethrough upon closure of said die parts;

a pressurized source of said fluid for causing said fluid to flow through said sensing line and said orifice when said die parts are open and compressing said fluid in said sensing line when said die parts are closed; and a self-contained control module including:

a fluid manifold including first, second, and third branches with the second and third branches coaxially aligned and intersected by the first branch;

said first branch being connected to said sensing line;

a valve means interconnected between said second branch and said pressurized source for regulating the pressure and rate of delivery of fluid delivered through said sensing line to said orifice from said pressurized source;

a sensing means connected to said third branch for sensing the pressure of said fluid in said sensing line and for producing an electrical control signal when the sensed pressure reaches a preselected value, said sensing means including a fluid inlet.

12. The apparatus of claim 11, wherein said control module includes means for providing a visual indication of the pressure in said sensing line and including a fluid inlet connected with said first fluid passageway.

13. The apparatus of claim 12, wherein said indication means is mounted on and supported by said manifold.

14. The apparatus of claim 11, wherein said module includes a mounting plate, said manifold being secured to said mounting plate, and a cover on one side of said mounting plate and covering said valve means and said manifold.

15. The apparatus of claim 14, wherein said first passageway includes a fluid inlet in one side of said manifold and said second passageway includes a fluid outlet in said one side of said manifold, said cover including an opening therein, said one side of said manifold being disposed adjacent said opening to permit access of said inlet and said outlet in said manifold from outside said cover.

16. The apparatus of claim 14, wherein said valve means includes a valve for controlling the flow of fluid from said source to said second passageway, said cover including an opening therein, and said valve including a manually actuatable member for controlling said valve, said manually actuatable portion extending through said opening and exterior of said cover.

17. The apparatus of claim 14, wherein:

said sensing means includes an electrical switch for producing said electrical control signal, and said module includes a receptacle secured on said mounting plate, said switch being contained within said receptacle.

18. The apparatus of claim 15, wherein said sensing means extends between said cover and said receptacle.

19. The apparatus of claim 15, wherein said receptacle includes a removable cover allowing access to said switch.

* * * * *